US012533889B2

(12) United States Patent
Kataniwa

(10) Patent No.: US 12,533,889 B2
(45) Date of Patent: Jan. 27, 2026

(54) LIQUID EJECTING HEAD AND LIQUID EJECTING APPARATUS

(71) Applicant: SEIKO EPSON CORPORATION, Tokyo (JP)

(72) Inventor: Yuichi Kataniwa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 192 days.

(21) Appl. No.: 18/419,413

(22) Filed: Jan. 22, 2024

(65) Prior Publication Data

US 2024/0246341 A1 Jul. 25, 2024

(30) Foreign Application Priority Data

Jan. 24, 2023 (JP) ................................ 2023-008584

(51) Int. Cl.
*B41J 2/175* (2006.01)
*B41J 2/14* (2006.01)

(52) U.S. Cl.
CPC ....... *B41J 2/17563* (2013.01); *B41J 2/14201* (2013.01); *B41J 2/14233* (2013.01); *B41J 2002/14241* (2013.01); *B41J 2002/14403* (2013.01)

(58) Field of Classification Search
CPC ................ B41J 2/17563; B41J 2/14201; B41J 2/14233; B41J 2002/14241; B41J 2002/14403
See application file for complete search history.

(56) References Cited

U.S. PATENT DOCUMENTS

| | | | | |
|---|---|---|---|---|
| 7,775,652 B2 * | 8/2010 | Taira | ...................... B41J 2/1607 347/93 |
| 8,888,260 B2 * | 11/2014 | Hayashi | ............... B41J 2/14274 347/93 |
| 2006/0001718 A1 | 1/2006 | Shimizu | |

FOREIGN PATENT DOCUMENTS

| | | |
|---|---|---|
| JP | 2006-15506 A | 1/2006 |

* cited by examiner

*Primary Examiner* — Geoffrey S Mruk
(74) *Attorney, Agent, or Firm* — WORKMAN NYDEGGER

(57) ABSTRACT

A liquid ejecting head includes: a first-flow-path-member having a first-surface in which a first-opening is formed; a second-flow-path-member having a second-surface in which a second-opening is formed; and a filter member disposed between the first-surface and the second-surface, in which the second-opening is larger than the first-opening in plan view, the filter member has a first-region in which first holes are provided, and a second-region positioned around the first-region and in which second holes are provided in plan view, the first-region includes a filter region which partitions off the first-opening and the second-opening and through which liquid passes, the second-region is in contact with both the first-surface and the second-surface, and includes a first-fixed-region to which an adhesive adheres, and an area of each of the second-holes is larger than an area of each of the first-holes in plan view.

15 Claims, 9 Drawing Sheets

LIQUID EJECTING HEAD AND LIQUID EJECTING APPARATUS

The present application is based on, and claims priority from JP Application Serial Number 2023-008584, filed Jan. 24, 2023, the disclosure of which is hereby incorporated by reference herein in its entirety.

BACKGROUND

1. Technical Field

The present disclosure relates to a liquid ejecting head and a liquid ejecting apparatus.

2. Related Art

In a liquid ejecting apparatus such as an ink jet printer, a filter for capturing foreign matter may be provided in the middle of a liquid flow path toward a nozzle that ejects liquid such as ink.

For example, an ink jet head described in JP-A-2006-15506 includes a flow path member, a head unit having an ink supply port, and a filter disposed between the flow path member and the head unit. The filter has a filter region corresponding to the ink supply port, and a fixed region provided around the outer periphery of the filter region. The filter has a plurality of filter holes, and among the plurality of filter holes, some of the filter holes are provided in the filter region, and the remaining filter holes are provided in the fixed region. In the fixed region, the flow path member, the head unit, and the filter are bonded to each other.

In the ink jet head described in JP-A-2006-15506, the size of the filter hole in the fixed region is the same as the size of the filter hole in the filter region. Here, it is necessary to make the size of the filter hole in the filter region smaller than the size of the nozzle in order to prevent the nozzle from clogging due to foreign matter. For this reason, a bonding area for bonding the flow path member and the head unit to each other through the filter holes in the fixed region becomes small, and thus, there is a possibility that the flow path member and the head unit cannot be bonded to each other with a sufficient bonding strength.

SUMMARY

According to an aspect of the present disclosure, a liquid ejecting head includes: a nozzle that ejects liquid; a first flow path member that has a first surface in which a first opening of a first flow path communicating with the nozzle is formed; a second flow path member that has a second surface in which a second opening of a second flow path communicating with the nozzle and coupled to the first flow path is formed; and a filter member that is disposed between the first surface and the second surface, in which the second opening is larger than the first opening in plan view, the filter member has a first region in which a plurality of first holes are provided, and a second region which is positioned around the first region and in which a plurality of second holes are provided in the plan view, the first region includes a filter region which partitions off the first opening and the second opening and through which the liquid to be supplied to the nozzle passes, the second region is in contact with both the first surface and the second surface, and includes a first fixed region to which an adhesive adheres, and an area of each of the plurality of second holes is larger than an area of each of the plurality of first holes in the plan view.

According to an aspect of the present disclosure, a liquid ejecting apparatus includes the liquid ejecting head according to the above-described aspect.

DESCRIPTION OF EMBODIMENTS

Figure 1:
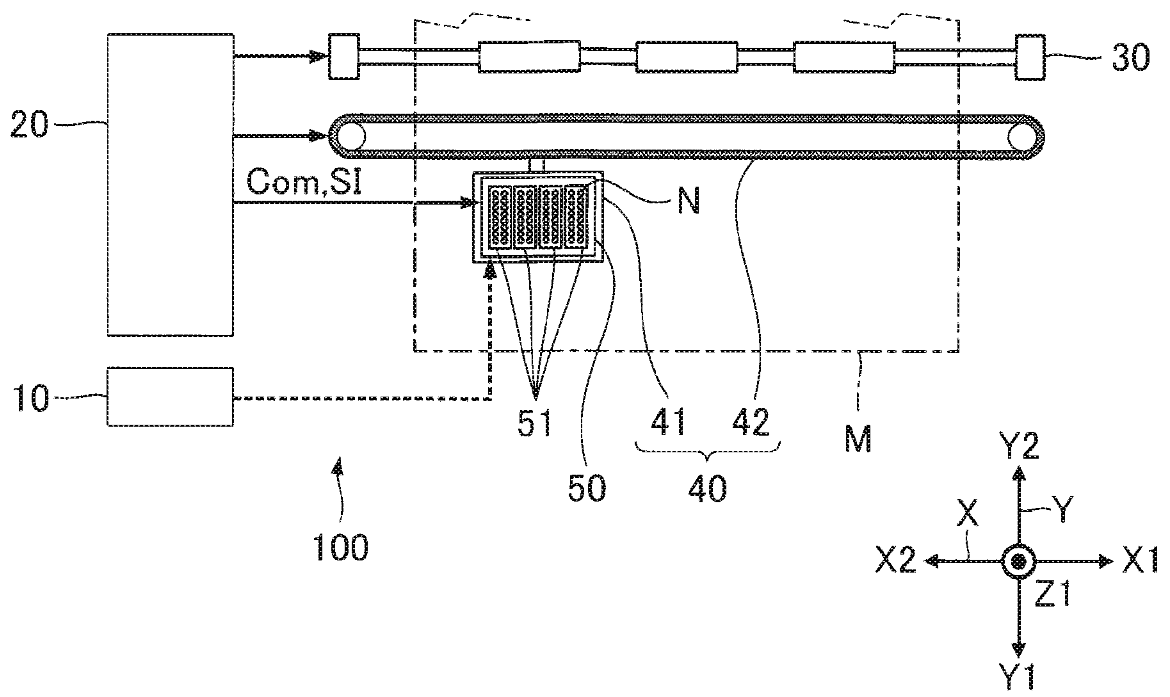
FIG. 1 is a schematic diagram illustrating a configuration example of a liquid ejecting apparatus according to a first embodiment.

Hereinafter, exemplary embodiments according to the present disclosure will be described with reference to the accompanying drawings. Note that the dimensions and the scale of each component may differ appropriately from actual dimensions and scale, and some portions are schematically illustrated in the drawings to facilitate understanding. Further, the scope of the present disclosure is not limited to the embodiments unless otherwise specified in the following description.

In the following description, an X axis, a Y axis, and a Z axis that intersect one another are appropriately used for the sake of convenience. The Y axis is an example of a "first axis". Hereinafter, a direction along the X axis is referred to as an X1 direction, and a direction opposite to the X1 direction is referred to as an X2 direction. Similarly, directions opposite to each other along the Y axis are a Y1 direction and a Y2 direction. Further, directions opposite to each other along the Z axis are a Z1 direction and a Z2 direction. The Z1 direction or the Z2 direction corresponds to a direction in which a "first flow path member", a "filter member", and a "second flow path member" are stacked. Hereinafter, viewing in the Z1 direction or the Z2 direction may be referred to as "plan view".

Here, typically, the Z axis is a vertical axis, and the Z2 direction corresponds to a downward direction along the vertical axis. However, the Z axis does not have to be a vertical axis. The X axis, the Y axis, and the Z axis are typically orthogonal to one another. However, the X axis, the Y axis, and the Z axis are not limited thereto, and it is sufficient that the X axis, the Y axis, and the Z axis intersect one another within an angle range of 80° to 100°, for example.

A: First Embodiment

A1: Overall Configuration of Liquid Ejecting Apparatus

FIG. 1 is a schematic diagram illustrating a configuration example of a liquid ejecting apparatus 100 according to a first embodiment. The liquid ejecting apparatus 100 is an ink jet printing apparatus that ejects ink, which is an example of "liquid", in the form of droplets toward a recording medium M. The recording medium M is, for example, printing paper. The recording medium M is not limited to printing paper, and may be a printing target made of any material such as a resin film or cloth, for example.

As illustrated in FIG. 1, the liquid ejecting apparatus 100 includes a liquid container 10, a control module 20, a transport mechanism 30, a moving mechanism 40, and a liquid ejecting head 50.

The liquid container 10 stores the ink. Specific aspects of the liquid container 10 include, for example, a cartridge that is attachable to and detachable from the liquid ejecting apparatus 100, a bag-shaped ink pack made of a flexible film, and an ink tank that can be refilled with ink. The type of the ink stored in the liquid container 10 is arbitrary.

The control module 20 controls an operation of each element of the liquid ejecting apparatus 100. The control module 20 includes, for example, a processing circuit such as a central processing unit (CPU) or a field programmable gate array (FPGA), and a storage circuit such as a semiconductor memory. Here, the control module 20 outputs a drive signal Com for driving the liquid ejecting head 50 and a control signal SI for controlling the driving of the liquid ejecting head 50.

The transport mechanism 30 transports the recording medium M along the Y axis under the control of the control module 20.

The moving mechanism 40 reciprocates the liquid ejecting head 50 along the X axis under the control of the control module 20. The moving mechanism 40 includes a substantially box-shaped transport body 41 called a carriage that accommodates the liquid ejecting head 50, and an endless transport belt 42 to which the transport body 41 is fixed. The number of liquid ejecting heads 50 mounted on the transport body 41 is not limited to one, and may be plural. In addition to the liquid ejecting head 50, the above-described liquid container 10 may be mounted on the transport body 41.

The liquid ejecting head 50 ejects the ink supplied from the liquid container 10 onto the recording medium M from each of a plurality of nozzles under the control of the control module 20. The ejection is performed in parallel with the transport of the recording medium M by the transport mechanism 30 and the reciprocating movement of the liquid ejecting head 50 by the moving mechanism 40, thereby forming an image on the surface of the recording medium M with the ink.

In the example illustrated in FIG. 1, the liquid ejecting head 50 includes a plurality of head chips 51. The head chip 51 includes a plurality of nozzles N that eject the ink. A configuration example of the head chip 51 will be described later with reference to FIGS. 2 and 3. The number of head chips 51 included in the liquid ejecting head 50 is not limited to that in the example illustrated in FIG. 1, and may be one or more and three or less, or five or more.

A2: Liquid Ejecting Head

Figure 2:
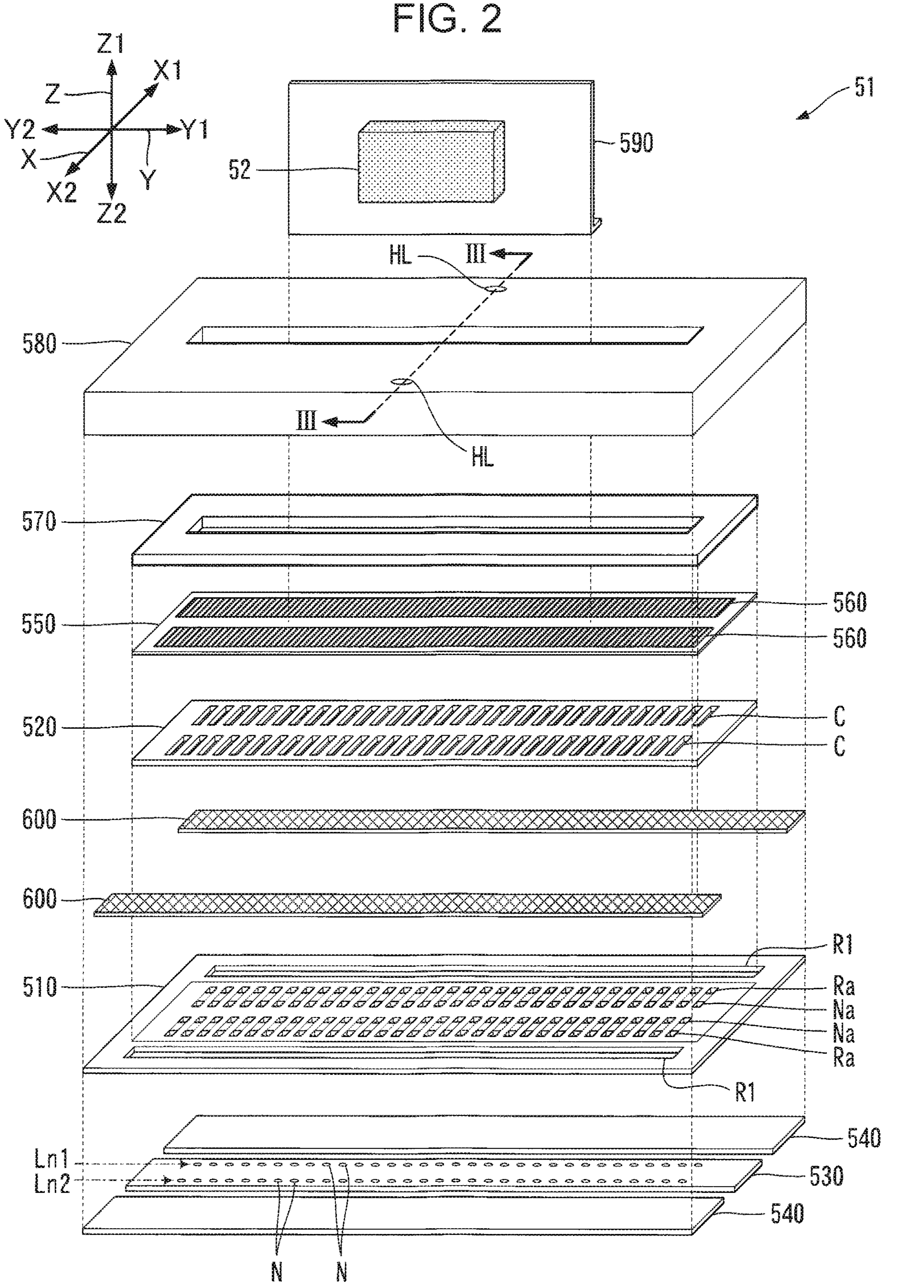
FIG. 2 is an exploded perspective view of a liquid ejecting head.
Figure 3:
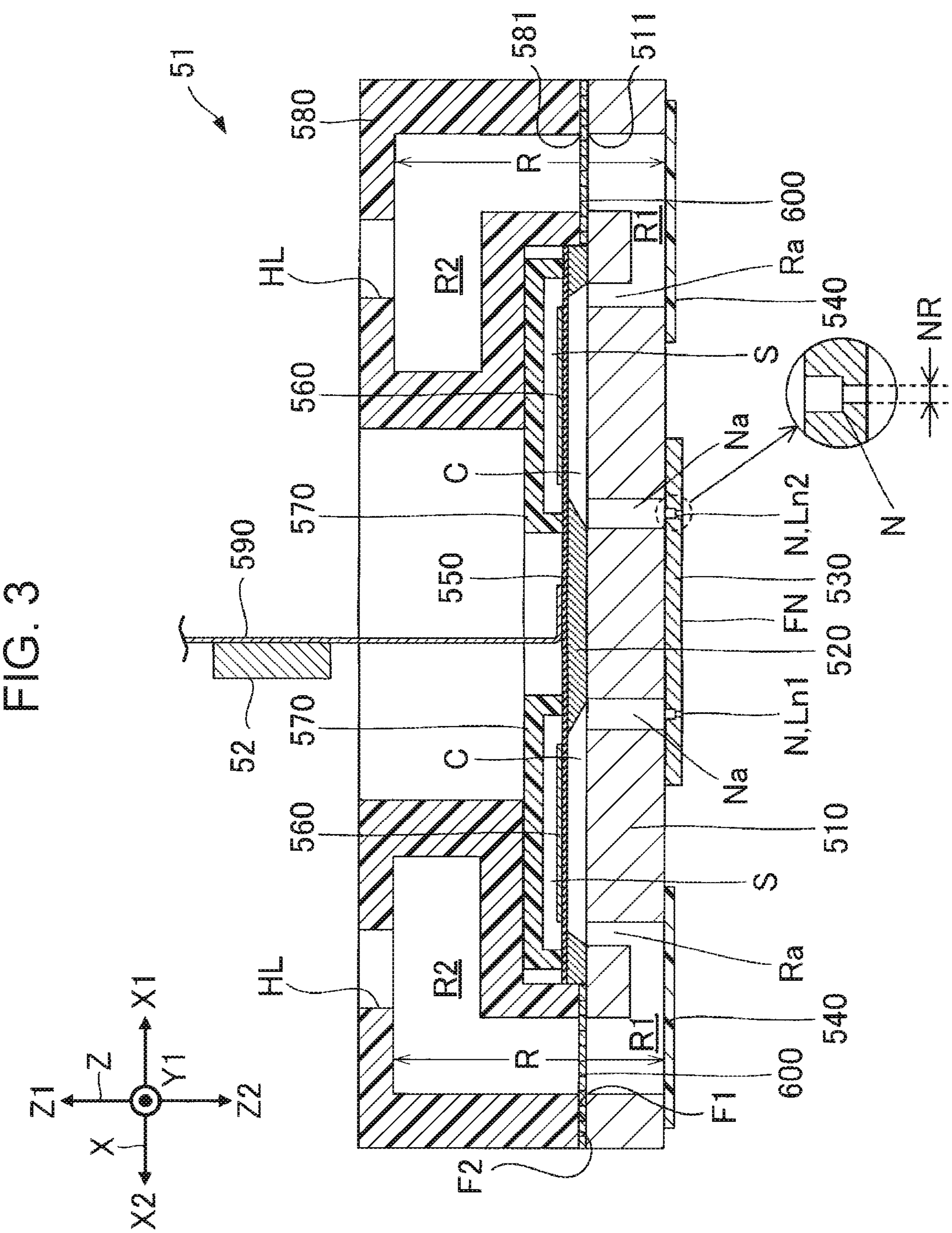
FIG. 3 is a cross-sectional view illustrating a configuration example of a head chip.

FIG. 2 is an exploded perspective view of the liquid ejecting head 50. FIG. 3 is a cross-sectional view illustrating a configuration example of the head chip 51. Note that FIG. 3 is a cross-sectional view taken along line III-III in FIG. 2.

As illustrated in FIGS. 2 and 3, the head chip 51 includes the plurality of nozzles N arranged in a direction along the Y axis.

The plurality of nozzles N included in the head chip 51 are divided into a first nozzle row Ln1 and a second nozzle row Ln2 that are spaced apart from each other in the direction along the X axis. Each of the first nozzle row Ln1 and the second nozzle row Ln2 is a set of the plurality of nozzles N linearly arranged in the direction along the Y axis.

The head chip 51 has a substantially symmetrical configuration in the direction along the X axis. However, positions of the plurality of nozzles N in the first nozzle row Ln1 and positions of the plurality of nozzles N in the second nozzle row Ln2 in the direction along the Y axis may coincide with or be different from each other. FIGS. 2 and 3 illustrate a configuration in which the positions of the plurality of nozzles N in the first nozzle row Ln1 and the positions of the plurality of nozzles N in the second nozzle row Ln2 in the direction along the Y axis coincide with each other.

As illustrated in FIGS. 2 and 3, the head chip 51 includes a flow path substrate 510 which is an example of the "first flow path member", a pressure chamber substrate 520, a nozzle substrate 530, a vibration absorber 540, a diaphragm 550, a plurality of piezoelectric elements 560, a protective substrate 570, a case 580 which is an example of the "second flow path member", a wiring substrate 590, and two filter members 600.

The flow path substrate 510 and the pressure chamber substrate 520 are stacked in this order in the Z1 direction and form a flow path for supplying the ink to the plurality of nozzles N. The diaphragm 550, the plurality of piezoelectric elements 560, the protective substrate 570, the case 580, the wiring substrate 590, the two filter members 600, and a drive circuit 52 are installed in a region positioned on a Z1-direction side of a stacked body including the flow path substrate 510 and the pressure chamber substrate 520. On the other hand, the nozzle substrate 530 and the vibration absorber 540 are installed in a region positioned on a Z2-direction side of the stacked body. Each element of the head chip 51 is generally a plate-like member elongated in the Y direction, and the respective elements of the head chip 51 are bonded to each other by, for example, an adhesive. Hereinafter, each element of the head chip 51 will be described.

The nozzle substrate 530 is a plate-like member provided with the plurality of nozzles N of each of the first nozzle row Ln1 and the second nozzle row Ln2. Each of the plurality of nozzles N is a through-hole through which the ink passes. Here, a surface of the nozzle substrate 530 that faces the Z2 direction is a nozzle surface FN. The nozzle substrate 530 is produced by processing a single crystal silicon substrate using a semiconductor producing technology that uses a processing technology such as dry etching or wet etching. However, another known method and material may be appropriately used to produce the nozzle substrate 530. Further, a cross-sectional shape of the nozzle N is typically circular, but is not limited thereto, and may be a non-circular shape such as a polygon or an ellipse.

In the flow path substrate 510, a first flow path R1, a plurality of supply flow paths Ra, and a plurality of communication flow paths Na are provided for each of the first nozzle row Ln1 and the second nozzle row Ln2. The first flow path R1 is a flow path that communicates with the nozzle N and is upstream of the nozzle N, and is an elongated hole that extends in the direction along the Y axis in plan view in the direction along the Z axis. An end of the hole in the Z1 direction forms a first opening 511 formed in a first surface F1, which is a surface of the flow path substrate 510 that faces the Z1 direction. Each of the supply flow paths Ra and the communication flow paths Na is a through-hole formed for each nozzle N. Each supply flow path Ra communicates with the first flow path R1.

The pressure chamber substrate 520 is a plate-like member in which a plurality of pressure chambers C called cavities are formed for each of the first nozzle row Ln1 and the second nozzle row Ln2. The plurality of pressure chambers C are arranged in the direction along the Y axis. Each pressure chamber C is formed for each nozzle N and is an elongated space extending in the direction along the X axis in plan view.

Each of the flow path substrate 510 and the pressure chamber substrate 520 is produced by processing a single crystal silicon substrate using, for example, a semiconductor producing technology, similarly to the nozzle substrate 530 described above. However, another known method and material may be appropriately used to produce each of the flow path substrate 510 and the pressure chamber substrate 520.

The pressure chamber C is positioned between the flow path substrate 510 and the diaphragm 550. The plurality of pressure chambers C are arranged in the direction along the Y axis for each of the first nozzle row Ln1 and the second nozzle row Ln2. Further, the pressure chamber C communicates with each of the communication flow path Na and the supply flow path Ra. Therefore, the pressure chamber C communicates with the nozzle N through the communication flow path Na and communicates with the first flow path R1 through the supply flow path Ra.

The diaphragm 550 is disposed on a surface of the pressure chamber substrate 520 that faces the Z1 direction. The diaphragm 550 is a plate-like member that can elastically vibrate. Although not illustrated, the diaphragm 550 includes, for example, an elastic film and an insulating film which are stacked in this order in the Z1 direction. For example, the elastic film is made of silicon oxide ($SiO_2$) and is formed by thermally oxidizing one surface of a single crystal silicon substrate. For example, the insulating film is made of zirconium oxide ($ZrO_2$) and is formed by forming a zirconium layer by sputtering, and thermally oxidizing the layer.

The diaphragm 550 is not limited to the above-described configuration in which the elastic film and the insulating film are stacked, and may be formed of a single layer or three or more layers, for example. Further, the material of each layer of the diaphragm 550 is not limited to the above-described materials, and may be, for example, silicon or silicon nitride.

The plurality of piezoelectric elements 560 corresponding to the respective nozzles N are disposed on a surface of the diaphragm 550 that faces the Z1 direction for each of the first nozzle row Ln1 and the second nozzle row Ln2. Each piezoelectric element 560 is a passive element that deforms by being supplied with a potential according to the drive signal Com, and causes pressure fluctuations in ink within the pressure chamber C. Each piezoelectric element 560 has an elongated shape extending in the direction along the X axis in plan view. The plurality of piezoelectric elements 560 are arranged in the direction along the Y axis in such a way as to correspond to the plurality of pressure chambers C. The piezoelectric element 560 overlaps the pressure chamber C in plan view.

Although not illustrated, each piezoelectric element 560 includes a first electrode, a piezoelectric body, and a second electrode stacked in this order in the Z1 direction. The first electrodes of the piezoelectric elements 560 are individual electrodes spaced apart from each other. A potential according to the drive signal Com is supplied to the first electrode. The second electrode is a band-shaped common electrode that extends in the direction along the Y axis in such a way that the second electrodes of the plurality of piezoelectric elements 560 are continuous. For example, a constant potential is supplied to the second electrode. Examples of metal materials of these electrodes include platinum (Pt), aluminum (Al), nickel (Ni), gold (Au), and copper (Cu). The metal materials can be used alone or in combination of two or more in the form of an alloy or a laminate. The piezoelectric body is made of a piezoelectric material such as lead zirconate titanate ($Pb(Zr, Ti)O_3$). In the piezoelectric element 560 described above, when a voltage is applied between the first electrode and the second electrode, the piezoelectric body deforms by an inverse piezoelectric effect. When the diaphragm 550 vibrates due to the deformation, a pressure in the pressure chamber C fluctuates, as a result of which the ink is ejected from the nozzle N.

The protective substrate 570 is a plate-like member installed on the surface of the diaphragm 550 that faces the Z1 direction, and protects the plurality of piezoelectric elements 560 and reinforces a mechanical strength of the diaphragm 550. Here, the plurality of piezoelectric elements 560 are accommodated in a space S between the protective substrate 570 and the diaphragm 550. The protective substrate 570 is made of, for example, a resin material.

The case 580 is a case for storing the ink to be supplied to the plurality of pressure chambers C. The case 580 is made of, for example, a resin material. The case 580 is provided with a second flow path R2 for each of the first nozzle row Ln1 and the second nozzle row Ln2. The second flow path R2 is a space coupled to the first flow path R1 described above, and is an elongated hole that extends in the direction along the Y axis in plan view in the direction along the Z axis. An end of the hole in the Z2 direction forms a second opening 581 formed in a second surface F2, which is a surface of the case 580 that faces the Z2 direction. The second flow path R2 communicates with the nozzle N, and functions together with the first flow path R1 as a reservoir R that stores the ink to be supplied to the plurality of pressure chambers C. The case 580 is provided with an inlet HL for supplying the ink to each reservoir R. The ink in each reservoir R is supplied to the pressure chamber C through each supply flow path Ra. Aspects such as the position and number of inlets HL for each reservoir R are not limited to those in the example illustrated in FIGS. 2 and 3, and are arbitrary.

A filter member 600 is provided in each reservoir R. The filter member 600 is a member that captures foreign matter heading toward the nozzle N while allowing the ink to pass therethrough. In the example illustrated in FIGS. 2 and 3, the filter member 600 is arranged in such a way as to divide the reservoir R into the first flow path R1 and the second flow path R2. Here, the filter member 600 is interposed between the flow path substrate 510 and the case 580, and is bonded to the flow path substrate 510 and the case 580. The filter member 600 is made of metal such as NiPd, and is produced by electroforming. Note that a method for producing the filter member 600 is not limited to electroforming, and may also be a method using etching, for example. Alternatively, the two filter members 600 may be coupled to each other to form a frame shape. Details of the filter member 600 are described below with reference to FIGS. 4 to 6.

The vibration absorber 540 is also called a compliance substrate, is a flexible resin film forming a wall surface of the reservoir R, and absorbs pressure fluctuations in ink within the reservoir R. The vibration absorber 540 may be a flexible thin metal plate. A surface of the vibration absorber 540 that faces the Z1 direction is bonded to the flow path substrate 510 with an adhesive or the like.

The wiring substrate 590 is mounted on the surface of the diaphragm 550 that faces the Z1 direction, and is a mounted component for electrically coupling the control module 20 and the head chip 51. The wiring substrate 590 is, for example, a flexible wiring substrate such as a chip on film (COF), a flexible printed circuit (FPC), or a flexible flat cable (FFC). The drive circuit 52 is mounted on the wiring substrate 590 of the present embodiment. The drive circuit 52 switches whether or not to supply a pulse included in the drive signal Com output from the control module 20 to each of the plurality of piezoelectric elements 560 included in the head chip 51 under the control of the control module 20. The wiring substrate 590 may be a rigid substrate. In this case, the drive circuit 52 is mounted on the rigid substrate or a flexible substrate coupled to the rigid substrate.

A3: Filter Member

Figure 4:
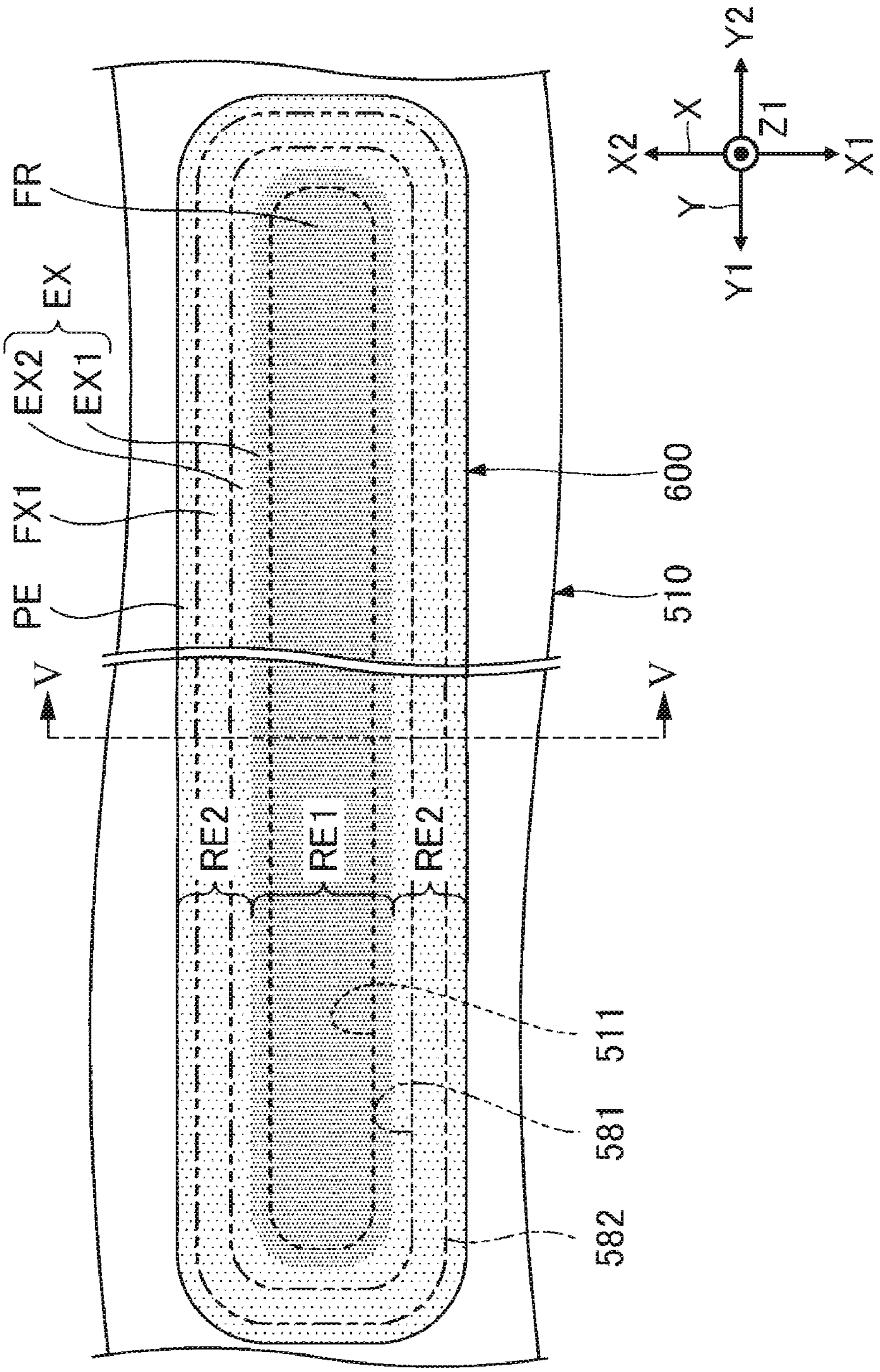
FIG. 4 is a plan view illustrating a positional relationship between a first opening, a second opening, and a filter member according to the first embodiment.
Figure 5:
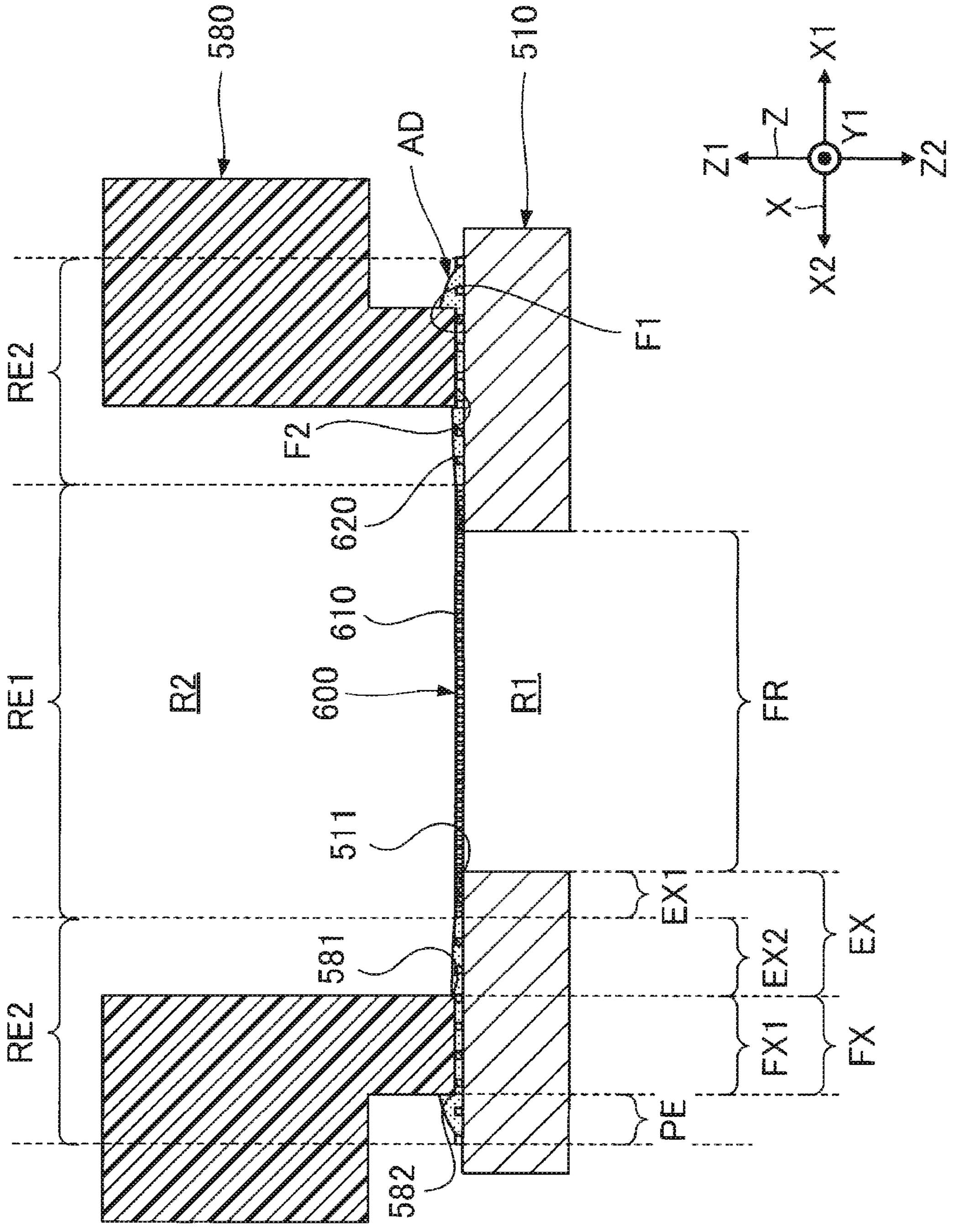
FIG. 5 is a cross-sectional view taken along line V-V in FIG. 4.

FIG. 4 is a plan view illustrating a positional relationship between the first opening 511, the second opening 581, and the filter member 600 according to the first embodiment. FIG. 5 is a cross-sectional view taken along line V-V in FIG. 4. FIGS. 4 and 5 schematically illustrate a configuration related to bonding between the flow path substrate 510, the case 580, and the filter member 600.

As illustrated in FIG. 5, the first opening 511, which is an opening of the first flow path R1, is formed in the first surface F1 of the flow path substrate 510. On the other hand, the second opening 581, which is an opening of the second flow path R2, is formed in the second surface F2 of the case 580.

As illustrated in FIG. 4, the first opening 511 is positioned inside the second opening 581 in plan view. Therefore, the second opening 581 is larger than the first opening 511 in plan view. Therefore, an ink flow path resistance between the first flow path R1 and the second flow path R2 is defined by the first opening 511. Furthermore, since the sizes of the first opening 511 and the second opening 581 are different from each other, even when there is a slight deviation in positioning of the flow path substrate 510 and the case 580 in a direction orthogonal to the Z axis, fluctuation in the flow path resistance can be reduced.

As illustrated in FIG. 5, the filter member 600 is a sheet-like member disposed between the first surface F1 and the second surface F2. The thickness of the filter member 600 is not particularly limited. For example, the thickness of the filter member 600 is in a range of 4 μm or more and 50 μm or less and may be in a range of 4 μm or more and 30 μm or less. The thickness of the filter member 600 according to the present embodiment is 6 μm.

Here, the filter member 600 is fixed to the first surface F1 and the second surface F2 by being bonded using an adhesive AD. In the example illustrated in FIGS. 4 and 5, an outer peripheral edge of the filter member 600 is positioned outside an outer peripheral edge 582 of the second surface F2 in plan view.

The filter member 600 has a first region RE1 and a second region RE2 positioned around the first region RE1 in plan view. In FIG. 4, the first region RE1 and the second region RE2 are displayed in different shades of grayscale. In the example illustrated in FIG. 4, the second region RE2 is provided over the entire periphery of the first region RE1.

Aspects such as the shape and size of the second region RE2 are not limited to those in the example illustrated in FIG. 4. For example, the shape of the second region RE2 is not limited to the shape extending over the entire periphery of the first region RE1, and may be a shape in which the second region RE2 is provided at a part of the first region RE1 in a circumferential direction. Further, a part of the first region RE1 may be provided in a fixed region FX described below.

A plurality of first holes 610 are formed in the first region RE1. Each first hole 610 is a hole that penetrates through the filter member 600 in a thickness direction. Here, for example, each first hole 610 has a size enough to capture foreign matter that may cause clogging of the nozzle N. Details of the first hole 610 are described below with reference to FIG. 6.

In the example illustrated in FIG. 5, the first region RE1 includes a filter region FR and a first exposed region EX1.

The filter region FR partitions off the first opening 511 and the second opening 581, and the plurality of first holes 610 through which the ink supplied to the nozzle N passes are formed in the filter region FR. Here, the filter region FR is a region positioned inside the first opening 511 in the first region RE1 in plan view. Further, the filter region FR has a shape extending along the Y axis in such a way as to correspond to the shapes of the first opening 511 and the second opening 581 in plan view.

The first exposed region EX1 is positioned around the filter region FR, overlaps the first surface F1, and is exposed to the second opening 581 in plan view. Here, the first exposed region EX1 is a region positioned outside the first opening 511 in the first region RE1 in plan view. The plurality of first holes 610 are formed in the first exposed region EX1, and the plurality of first holes 610 are substantially closed by the first surface F1. Note that a part of the adhesive AD may adhere to the first exposed region EX1.

In the present embodiment, the first exposed region EX1 is provided over the entire periphery of the filter region FR in the circumferential direction. Note that the first exposed region EX1 may be provided over only a part of the filter region FR in the circumferential direction.

A plurality of second holes 620 are formed in the second region RE2. Each second hole 620 is a hole that penetrates through the filter member 600 in the thickness direction. However, an area of each second hole 620 is larger than an area of each first hole 610 in plan view. Details of the second hole 620 are described below with reference to FIG. 6.

In the example illustrated in FIG. 5, the second region RE2 includes a first fixed region FX1, a second exposed region EX2, and an outer peripheral region PE.

The first fixed region FX1 is in contact with both the first surface F1 and the second surface F2. In the example illustrated in FIG. 5, the first fixed region FX1 is a region positioned outside the second opening 581 in the second region RE2 and positioned inside the outer peripheral edge 582 of the second surface F2 in plan view. That is, the first fixed region FX1 forms the fixed region FX that overlaps both the first surface F1 and the second surface F2 in plan view. In the present specification, the term “contact” includes not only a case where there is no gap between two target members, but also a case where an adhesive having a thickness of 10 μm or less is interposed between two members.

The adhesive AD adheres to the first fixed region FX1. Here, since the plurality of second holes 620 are provided in the second region RE2 as described above, the adhesive AD adhering to the first fixed region FX1 is in contact with both the first surface F1 and the second surface F2 through each second hole 620. Thereby, the filter member 600 is bonded to each of the first surface F1 and the second surface F2 in the first fixed region FX1.

It is sufficient that the adhesive AD be any adhesive that is adherable to each of the first surface F1 and the second surface F2. The adhesive AD is not particularly limited and may be, for example, an epoxy-based adhesive or a silicone-based adhesive. The adhesive AD may contain inorganic powder such as silica powder or alumina powder.

The second exposed region EX2 is positioned between the first fixed region FX1 and the filter region FR in plan view, and overlaps the first surface F1. Here, the second exposed region EX2 is a region positioned inside the second opening 581 in the second region RE2 in plan view. The second exposed region EX2 forms an exposed region EX that overlaps the first surface F1 without overlapping the second surface F2 in plan view, together with the first exposed region EX1 described above. As described above, in the present embodiment, a boundary BD between the first region RE1 and the second region RE2 overlaps the first surface F1 without overlapping the second surface F2, so that the exposed region EX includes the first exposed region EX1 and the second exposed region EX2. Note that a part of the adhesive AD may adhere to the second exposed region EX2.

The outer peripheral region PE is positioned around the fixed region FX, overlaps the first surface F1, and does not overlap the second surface F2 in plan view. Here, the outer peripheral region PE is a region positioned outside the outer peripheral edge 582 in the second region RE2 in plan view. The plurality of second holes 620 are formed in the outer peripheral region PE. As such an outer peripheral region PE is provided in the second region RE2, even when the filter member 600 is misaligned, fluctuation in adhesiveness of the filter member 600 for the first surface F1 and the second surface F2 can be reduced. Note that a part of the adhesive AD may adhere to the outer peripheral region PE.

In the present embodiment, the outer peripheral region PE is provided over the entire periphery of the fixed region FX in the circumferential direction. The outer peripheral region PE may be provided over only a part of the fixed region FX in the circumferential direction. Further, the outer peripheral region PE may be provided as necessary and may be omitted. In other words, the outer peripheral edge 582 may be positioned outside the outer periphery of the filter member 600 or the second region RE2.

Figure 6:
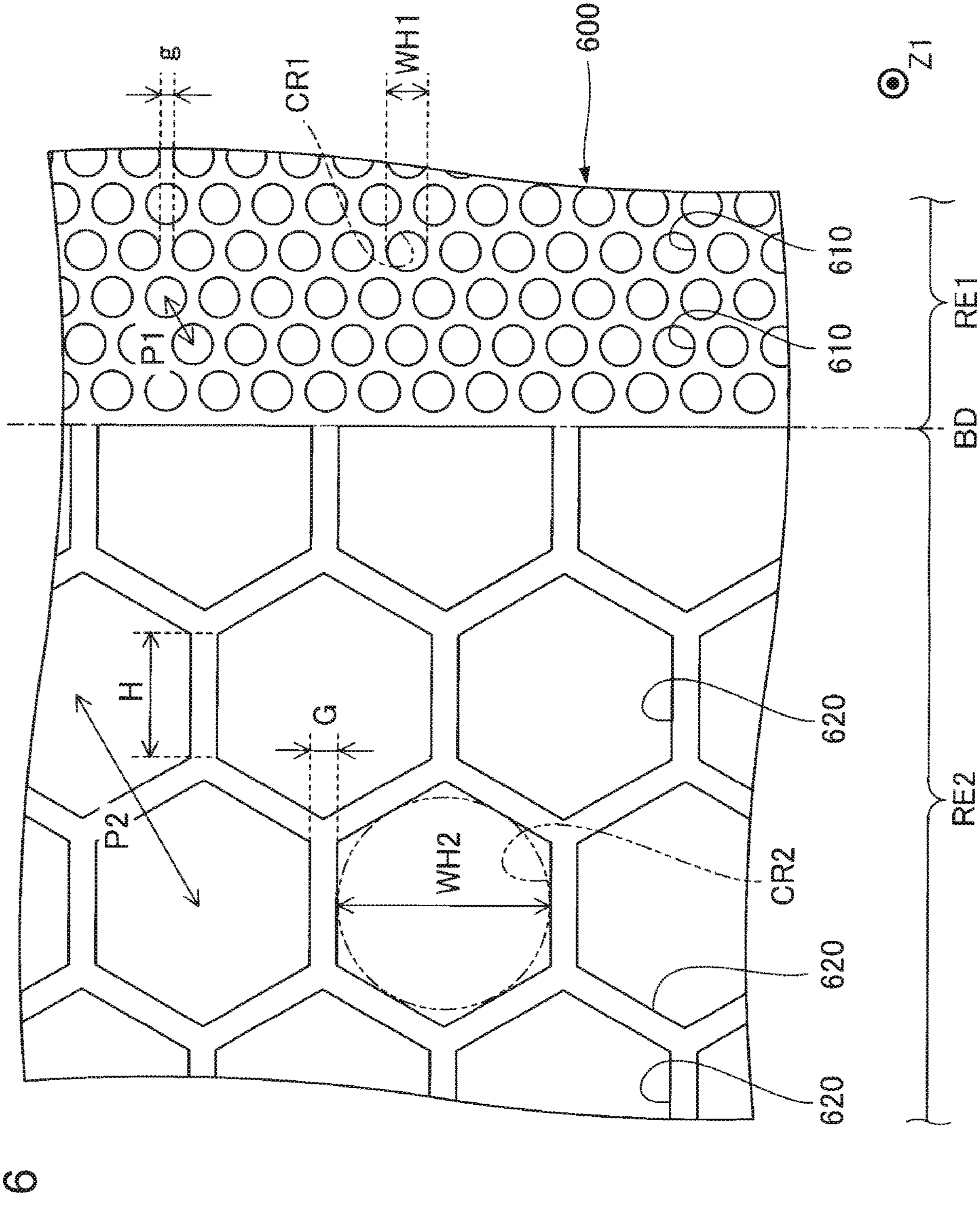
FIG. 6 is a plan view of a portion of the filter member.

FIG. 6 is a plan view of a portion of the filter member 600. The plurality of first holes 610 are formed in the first region RE1 as illustrated in FIG. 6. In the example illustrated in FIG. 6, the plurality of first holes 610 are regularly arranged in a staggered manner in plan view. Further, each of the plurality of first holes 610 has a circular shape in plan view. In addition, the plurality of first holes 610 have the same shape and size in plan view.

The arrangement of the plurality of first holes 610 is not limited to that in the example illustrated in FIG. 6. For example, the plurality of first holes 610 may be arranged in a grid pattern or may be randomly arranged. Further, the shape of the plurality of first holes 610 in plan view is not limited to that in the example illustrated in FIG. 6, and may be, for example, an ellipse or a polygon such as a triangle, quadrangle, or hexagon. Further, the plurality of first holes 610 may include two or more types of holes having mutually different shapes or sizes in plan view.

An opening ratio of the first region RE1 with the plurality of first holes 610 is not particularly limited. For example, the opening ratio of the first region RE1 is within a range of 30% or more and 60% or less. The opening ratio of the first region RE1 is a ratio of an area of the plurality of first holes 610 with respect to an area of the first region RE1 in plan view. When the opening ratio is excessively small, a pressure loss when the ink passes through the filter region FR may become excessive. On the other hand, when the opening ratio is excessively large, it is difficult to ensure the mechanical strength required for the filter region FR depending on the thickness of the filter member 600, the shape of the first hole 610, or the like.

Meanwhile, the plurality of second holes 620 are formed in the second region RE2. In the example illustrated in FIG. 6, the plurality of second holes 620 are regularly arranged in a staggered manner in plan view. Further, each of the plurality of second holes 620 has a regular hexagonal shape in plan view. In addition, the plurality of second holes 620 have the same shape and size in plan view. However, near the boundary BD between the first region RE1 and the second region RE2, the second hole 620 has a hexagonal shape with a part missing in plan view. Note that such a second hole 620 having the hexagonal shape with a part missing may be provided as needed. The number of such second holes 620 may be less than half of the number of all second holes 620 including the second holes 620 having the hexagonal shape with a part missing, or the second hole 620 having the hexagonal shape with a part missing may be omitted.

Here, the area of each of the plurality of second holes 620 is larger than the area of each of the plurality of first holes 610 in plan view. In other words, a diameter WH1 of an inscribed circle CR1 of each of the plurality of first holes 610 is smaller than a diameter WH2 of an inscribed circle CR2 of each of the plurality of second holes 620 in plan view. Here, the inscribed circle CR1 can be expressed as the largest circle that is disposed inside the first hole 610 and is in contact with an inner edge of the first hole 610. Here, the inscribed circle CR2 can be expressed as the largest circle that is disposed inside the second hole 620 and is in contact with an inner edge of the second hole 620. Thereby, a bonding area of the adhesive AD with respect to the first surface F1 and the second surface F2 through each of the second holes 620 can be increased.

The specific diameter WH1 is not particularly limited, and is, for example, within a range of 0.01 mm or more and 0.03 mm or less. However, the diameter WH1 may be smaller than a diameter NR of an inscribed circle of the nozzle N in order to suitably prevent the nozzle from clogging. Here, the inscribed circle of the nozzle N can be expressed as the largest circle that is disposed inside the nozzle N and is in contact with an inner edge of the nozzle N. The specific diameter WH2 is not particularly limited and may be larger than the diameter WH1. For example, the specific diameter WH2 is in a range of 0.03 mm or more and 0.15 mm or less. The diameter NR of the nozzle N is not particularly limited, and is, for example, in a range of 0.02 mm or more and 0.04 mm or less.

The arrangement of the plurality of second holes 620 is not limited to the example illustrated in FIG. 6. For example, the plurality of second holes 620 may be arranged in a grid pattern, may be randomly arranged, or may form a tessellation. Further, the shape of the plurality of second holes 620 in plan view is not limited to that in the example illustrated in FIG. 6, and may be, for example, a circle, an ellipse, or a polygon such as a triangle or quadrangle. The triangle not only includes an equilateral triangle, but also includes triangles other than the equilateral triangle. The quadrangle not only includes a square, but also includes a rectangle, a parallelogram, a rhombus, a trapezoid, and the like. The hexagon not only includes a regular hexagon, but also includes a parallel hexagon. However, when the shape of the second hole 620 is a triangle, a quadrangle, or a hexagon, the shape of the second hole 620 may be an equilateral triangle, a square, or a regular hexagon from the viewpoint of both ensuring the mechanical strength of the filter member 600 and increasing the opening ratio. Furthermore, the shape of the second hole 620 may be any one of an equilateral triangle, a square, and a regular hexagon, and at the same time, the plurality of second holes 620 may form a regular tessellation. Further, the plurality of second holes 620 may include two or more types of holes having mutually different shapes or sizes in plan view.

However, the plurality of second holes 620 may be configured using holes whose shape is any one of a triangle, a quadrangle, and a hexagon in plan view as illustrated in FIG. 6 in order to efficiently increase an opening ratio of the second region RE2 with the plurality of second holes 620. Further, the holes whose shape is any one of a triangle, a quadrangle, and a hexagon in plan view may form a tessellation.

The opening ratio of the second region RE2 with the plurality of second holes 620 is not particularly limited. For example, the opening ratio of the second region RE2 is within a range of 50% or more and 75% or less. The opening ratio of the second region RE2 is a ratio of an area of the plurality of second holes 620 with respect to an area of the second region RE2 in plan view. When the opening ratio is excessively small, an effect of improving the bonding strength by the second hole 620 may not be sufficiently achieved depending on the size of the second hole 620 or the like. On the other hand, when the opening ratio is excessively large, it is difficult to ensure the mechanical strength required for the second region RE2 depending on the thickness of the filter member 600, the shape of the second hole 620, or the like.

However, the opening ratio of the second region RE2 with the plurality of second holes 620 may be larger than the opening ratio of the first region RE1 with the plurality of first holes 610 in order to increase the bonding area of the adhesive AD with respect to the first surface F1 and the second surface F2 through each second hole 620. A difference between the opening ratio of the second region RE2 and the opening ratio of the first region RE1 may be 5% or more. However, the difference may be 40% or less to prevent the pressure loss in the filter region FR from excessively increasing. In addition, the difference may be within a range of 10% or more and 20% or less from the viewpoint of balance with the performance of the filter region FR.

For example, when the plurality of first holes 610 form a tessellation in such a way that a line segment coupling the centers of three adjacent first holes 610 among the plurality of circular first holes 610 forms an equilateral triangle as illustrated in FIG. 6, the opening ratio of the first region RE1 is $90.6\times WH1^2/P1^2$. A pitch P1 is a distance between the centers of adjacent first holes 610. When the diameter WH1 of the first hole 610 is 0.017 mm, and a distance g between adjacent first holes 610 (in other words, a width of a frame for forming the first hole 610) is 0.006 mm (6 μm), the pitch P1 of the first holes 610 is 0.023 mm, and the opening ratio of the first region RE1 is about 49.496%. When the diameter WH1 of the first hole 610 is 0.014 mm, and the distance g between adjacent first holes 610 (in other words, the width of the frame for forming the first hole 610) is 0.006 mm (6 μm), the pitch P1 of the first holes 610 is 0.02 mm, and the opening ratio of the first region RE1 is about 44.394%. The distance g between adjacent first holes 610 may be equal to or larger than the thickness of the filter member 600 in order to ensure the mechanical strength of the filter region FR of the filter member 600. In the present embodiment, the distance g is equal to the thickness of the filter member 600, that is, 6 μm.

When the second holes 620 whose shape is a regular hexagon as illustrated in FIG. 6 form a regular tessellation, the opening ratio of the second region RE2 is $H^2/P2^2\times 100$, in which H is a length of one side of the second hole 620, and P2 is a pitch of the second holes 620. The pitch P2 is a distance between the centers of adjacent second holes 620. For example, when the length H of one side of the second hole 620 is 0.035 mm, and a distance G between adjacent second holes 620 (in other words, a width of a frame for forming the second hole 620) is 0.02 mm, the diameter WH2 of the second hole 620 is about 0.061 mm, the pitch P2 of the second holes 620 is 0.081 mm, and the opening ratio of the second region RE2 is about 56.539%. Further, for example, when the length H is 0.045 mm and the distance G is 0.02 mm, the diameter WH2 is about 0.061 mm, the pitch P2 is 0.081 mm, and the opening ratio of the second region RE2 is about 63.329%.

In order to increase the opening ratio of the second region RE2 with the plurality of second holes 620, $G<H/3^{1/2}$, in which H is the length of one side of each of the plurality of second holes 620, and G is the distance between two adjacent second holes 620 among the plurality of second holes 620, may be satisfied. The distance G may be larger than the thickness of the filter member 600 in order to ensure the mechanical strength of the second region RE2.

A4: Method of Bonding First Flow Path Member and Second Flow Path Member

Figure 7:
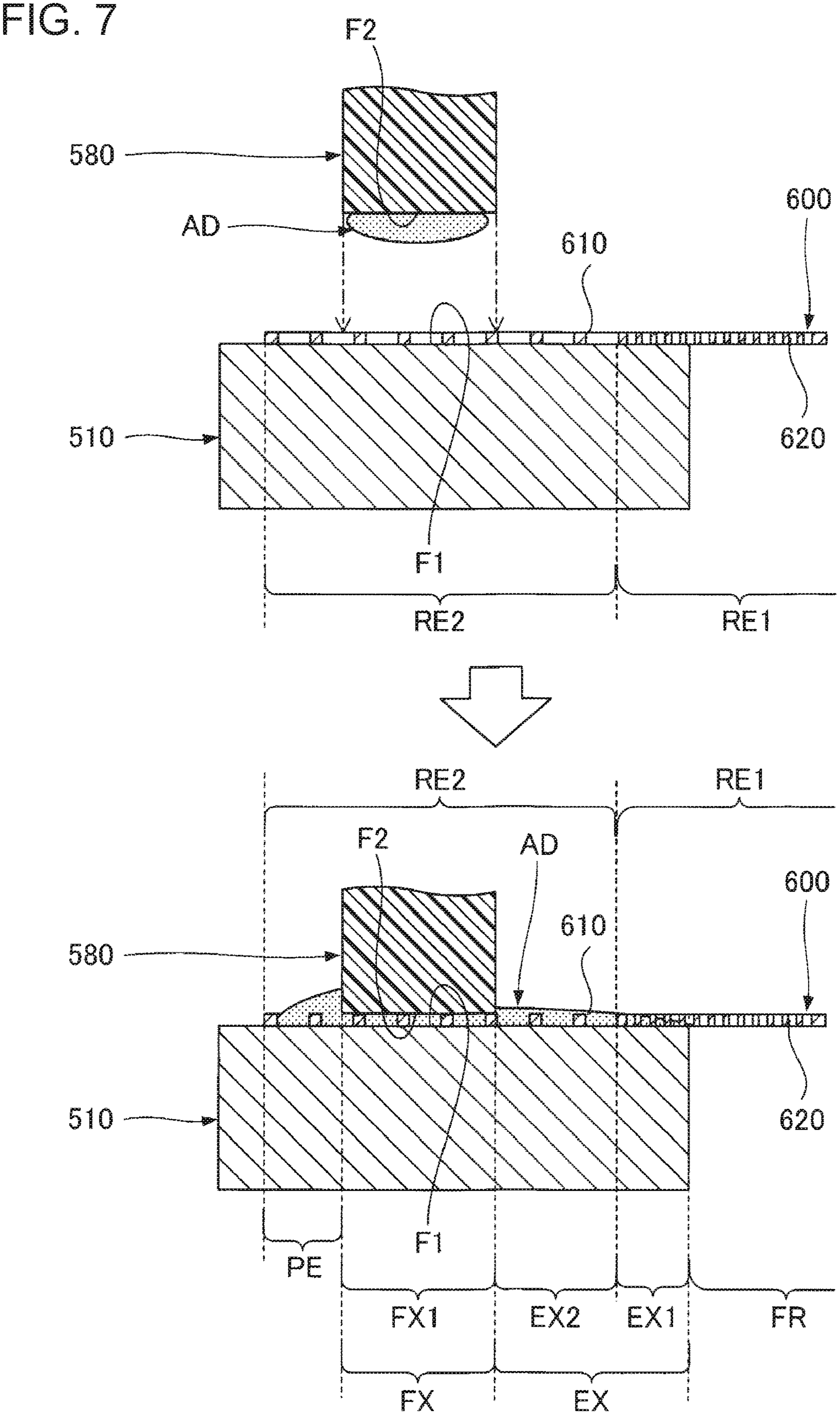
FIG. 7 is a view for describing a method of bonding a first flow path member and a second flow path member.

FIG. 7 is a view for describing a method of bonding the flow path substrate 510, which is an example of the "first flow path member", and the case 580, which is an example of the "second flow path member". FIG. 7 illustrates an example of the method of bonding the flow path substrate 510 and the case 580. The bonding method is a part of a method of producing the liquid ejecting head 50.

In the bonding method illustrated in FIG. 7, first, the unhardened adhesive AD is applied to the second surface F2 of the case 580 using a dispenser or the like as illustrated in the upper part of FIG. 7. Meanwhile, the filter member 600 is mounted on the first surface F1 of the flow path substrate 510 in such a way that the second region RE2 overlaps the first surface F1.

Then, as the second surface F2 to which the unhardened adhesive AD has adhered is bonded to the first surface F1 via the second region RE2, the unhardened adhesive AD adheres to the second region RE2 and also adheres to the first surface F1 through the second hole 620 as illustrated in the lower part of FIG. 7. As a result, the adhesive AD adheres to each of the flow path substrate 510, the case 580, and the filter member 600. Here, the unhardened adhesive AD also enters a minute gap between the filter member 600 and the flow path substrate 510 and a minute gap between the filter member 600 and the case 580.

By hardening the adhesive AD attached to the flow path substrate 510, the case 580, and the filter member 600 as described above, the flow path substrate 510 and the case 580 are bonded by the adhesive AD with the filter member 600 interposed therebetween.

With the above-described bonding method, the flow path substrate 510, the case 580, and the filter member 600 can be bonded at the same time in one bonding process. On the other hand, for example, when the second hole 620 is omitted, two bonding processes including a process of bonding the filter member 600 and the flow path substrate 510 and a process of bonding the filter member 600 and the case 580 are required. Furthermore, when the second hole 620 is omitted, the bonding strength may be poor because the second hole 620 does not provide an anchoring effect for the adhesive.

In the bonding method illustrated in FIG. 7, an aspect in which the unhardened adhesive AD is applied to the second surface F2 has been described by way of example. However, the bonding method it is not limited to the aspect. Even when the unhardened adhesive AD is applied to the first surface F1 or the second region RE2, it is possible to bond the flow path substrate 510, the case 580, and the filter member 600 at the same time with one bonding process as described above.

As described above, the liquid ejecting head 50 includes the nozzle N that ejects liquid, the flow path substrate 510 which is an example of the "first flow path member", the case 580 which is an example of the "second flow path member", and the filter member 600. The flow path substrate 510 has the first surface F1. The first opening 511 of the first flow path R1 is formed in the first surface F1. The first flow path R1 communicates with the nozzle N that ejects the ink which is an example of the "liquid". The case 580 has the second surface F2. The second opening 581 of the second flow path R2 is formed in the second surface F2. The second flow path R2 communicates with the nozzle N and is coupled to the first flow path R1. The filter member 600 is disposed between the first surface F1 and the second surface F2.

As described above, the second opening 581 is larger than the first opening 511 in plan view. Further, the filter member 600 has the first region RE1 in which the plurality of first holes 610 are provided and the second region RE2 in which the plurality of second holes 620 are provided. The second region RE2 is positioned around the first region RE1 in plan view.

The first region RE1 includes the filter region FR. The filter region FR partitions off the first opening 511 and the second opening 581, and the ink to be supplied to the nozzle N passes through the filter region FR. Meanwhile, the second region RE2 includes the first fixed region FX1. The first fixed region FX1 is in contact with both the first surface F1 and the second surface F2, and the adhesive AD adheres to the first fixed region FX1. In addition, the area of each of the plurality of second holes 620 is larger than the area of each of the plurality of first holes 610 in plan view.

In the liquid ejecting head 50 described above, the first fixed region FX1 is in contact with both the first surface F1 and the second surface F2 in a state in which the adhesive AD adheres to the first fixed region FX1, and thus, the filter member 600 is bonded to each of the first surface F1 and the second surface F2 in the first fixed region FX1. Here, since the plurality of second holes 620 are provided in the second region RE2 including the first fixed region FX1, the first surface F1 and the second surface F2 can be directly bonded with the adhesive AD through each second hole 620. Therefore, even when the adhesion of the adhesive AD with respect to the filter member 600 is not favorable, the effect of increasing the bonding strength of the filter member 600 with respect to the first surface F1 and the second surface F2 compared to an aspect in which the second hole 620 is omitted can be obtained. Moreover, since the area of each of the plurality of second holes 620 is larger than the area of each of the plurality of first holes 610 in plan view, the effect can be enhanced, and thus, the filter member 600 can be firmly bonded to the first surface F1 and the second surface F2.

The area of the second hole 620 may be five times or more larger than the area of the first hole 610 in plan view.

In the present embodiment, as described above, the plurality of second holes 620 are implemented using regular hexagonal holes in plan view. Therefore, the opening ratio of the second region RE2 can be maximized while ensuring the necessary mechanical strength of the second region RE2. In particular, since a stress applied to the filter member 600 is easily dispersed, damage to the second region RE2 can be suitably reduced.

As the plurality of second holes 620 are configured using holes whose shape is any one of a triangle, a quadrangle, and a hexagon in plan view, the opening ratio of the second region RE2 can be increased as compared with an aspect in which the second hole 620 has a circular shape in plan view, while ensuring the necessary mechanical strength of the second region RE2. As a result, the bonding strength of the filter member 600 with respect to the first surface F1 and the second surface F2 can be increased.

Further, as described above, $G<H/3^{1/2}$, in which H is the length of one side of each of the plurality of second holes 620, and G is the distance between two adjacent second holes 620 among the plurality of second holes 620, may be satisfied. In this case, the opening ratio of the second region RE2 can be increased.

Furthermore, as described above, when the filter member 600 is an electroformed component, that is, a component produced by electroforming, it is possible to obtain the filter member 600 having highly accurate first holes 610 and second holes 620. Further, as the filter member 600 is produced by electroforming, the filter member 600 can have an extremely small thickness. Therefore, the pressure loss when the liquid passes through the filter region FR can be reduced. Here, even when the thickness of the filter member 600 is extremely small, the necessary mechanical strength of the filter member 600 can be ensured by employing a honeycomb structure. Furthermore, the electroformed component is generally made of a material with poor adhesiveness, such as NiPd. Even when the filter member 600 is made of such a material with poor adhesiveness, the filter member 600 can be firmly bonded to the first surface F1 and the second surface F2 as described above.

As described above, the first region RE1 includes the first exposed region EX1. The first exposed region EX1 is positioned around the filter region FR, overlaps the first surface F1, and is exposed to the second opening 581 in plan view. Therefore, even when there is some deviation in the mutual positioning of the filter member 600 and the flow path substrate 510, it is possible to reduce a possibility that the second hole 620 overlaps the first opening 511. As a result, a possibility that foreign matter passes through the second hole 620 is reduced.

As described above, the second region RE2 includes the second exposed region EX2. The second exposed region EX2 is positioned between the first fixed region FX1 and the filter region FR, overlaps the first surface F1, and is exposed to the second opening 581 in plan view. Therefore, even when there is some deviation in the mutual positioning of the filter member 600 and the case 580, it is possible to reduce a possibility that the first hole 610 is interposed between the first surface F1 and the second surface F2. As a result, variations in bonding strength of the filter member 600 with respect to the first surface F1 and the second surface F2 can be reduced. Further, the second exposed region EX2 can contribute to bonding of the filter member 600 to the first surface F1. As a result, the bonding strength of the filter member 600 with respect to the first surface F1 and the second surface F2 can be increased.

Furthermore, as described above, the entire portion of at least one second hole 620 provided in the first fixed region FX1 among the plurality of second holes 620 is closed by the first surface F1 and the second surface F2. For this reason, the bonding strength of the filter member 600 with respect to the first surface F1 and the second surface F2 is increased compared to an aspect in which the entire portion of the at least one second hole 620 is not closed by the first surface F1 and the second surface F2.

In addition, as described above, the opening ratio of the second region RE2 may be larger than the opening ratio of the first region RE1. In this case, the bonding strength of the filter member 600 with respect to the first surface F1 and the second surface F2 can be increased compared to an aspect in which the opening ratio of the second region RE2 is smaller than the opening ratio of the first region RE1.

Further, as described above, the difference between the opening ratio of the second region RE2 and the opening ratio of the first region RE1 may be 5% or more. In this case, the bonding strength of the filter member 600 with respect to the first surface F1 and the second surface F2 can be increased.

In addition, as described above, the diameter WH1 of the inscribed circle CR1 of each of the plurality of first holes 610 is smaller than the diameter NR of the inscribed circle of each of the plurality of nozzles N in plan view. Therefore, foreign matter that can cause clogging of the nozzle N is prevented from passing through the first hole 610.

Further, as described above, each of the plurality of first holes 610 has a circular shape in plan view. Therefore, foreign matter is less likely to get caught in the first hole 610, the first hole 610 is less likely to expand, and cracks are less likely to occur in the first hole 610 as compared to an aspect in which the first hole 610 has a polygonal shape in plan view.

B: Second Embodiment

Hereinafter, a second embodiment of the present disclosure will be described. The reference numerals used in the description of the first embodiment are used for the elements having the same actions or functions as those of the first embodiment in the embodiment exemplified below, and a detailed description of each element is appropriately omitted.

Figure 8:
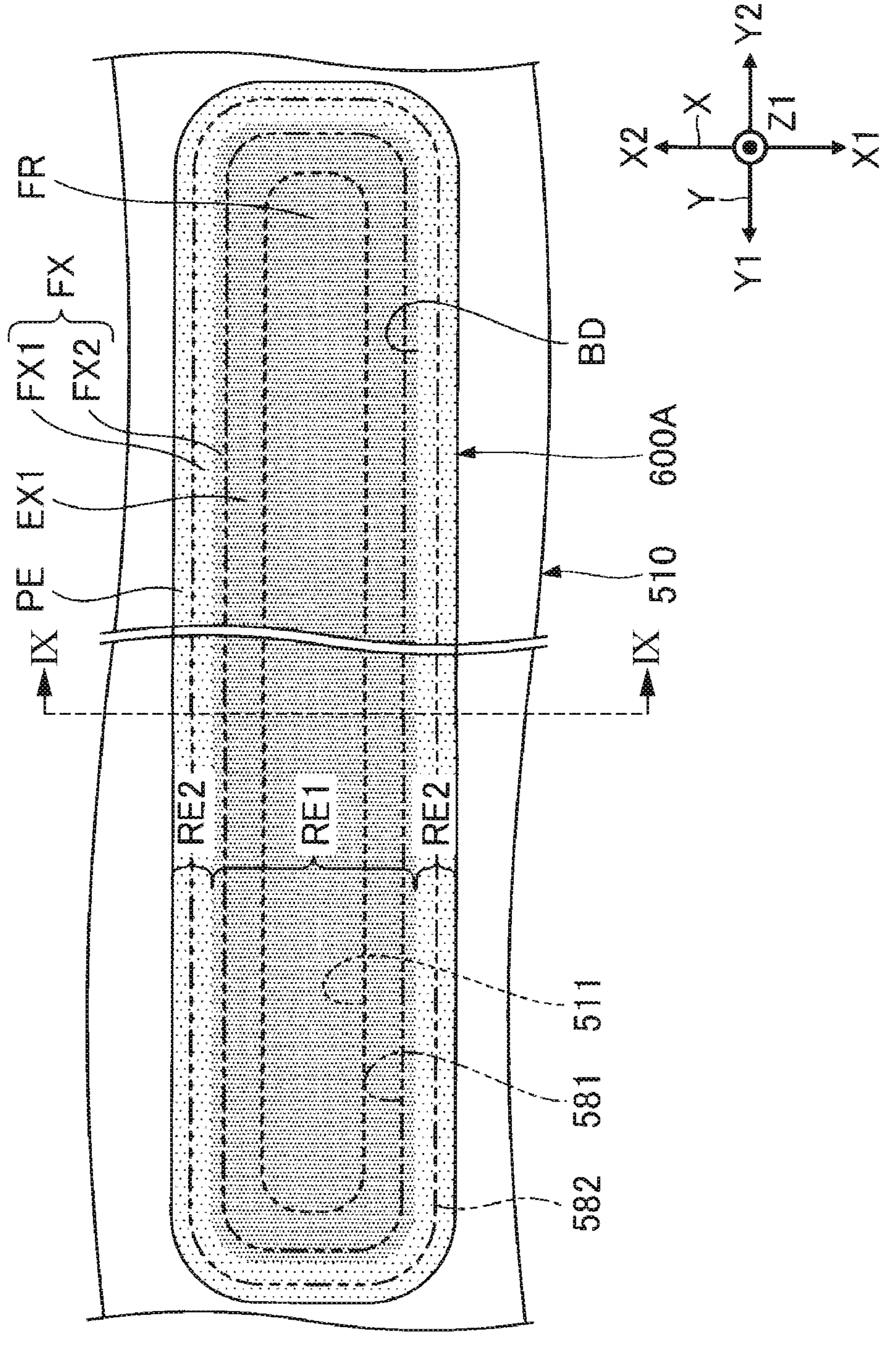
FIG. 8 is a plan view illustrating a positional relationship between a first opening, a second opening, and a filter member according to a second embodiment.
Figure 9:
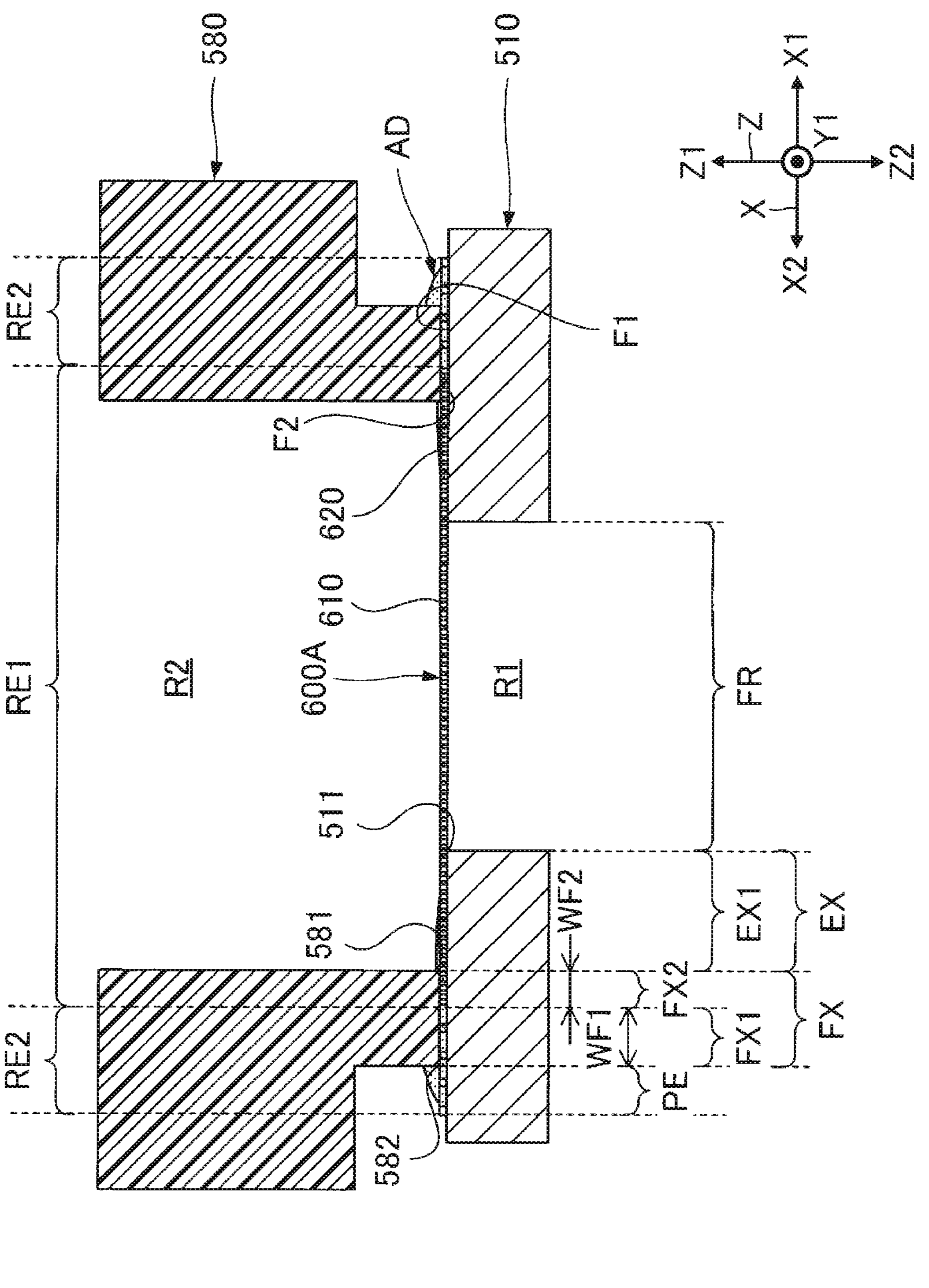
FIG. 9 is a cross-sectional view taken along line IX-IX in FIG. 8.

FIG. 8 is a plan view illustrating a positional relationship between a first opening 511, a second opening 581, and a filter member 600A according to the second embodiment. FIG. 9 is a cross-sectional view taken along line IX-IX in FIG. 8. The present embodiment is the same as the first embodiment described above, except that the filter member 600A is used instead of the filter member 600. The filter member 600A has configured similarly to the filter member 600 of the first embodiment, except that an area ratio between a first region RE1 and a second region RE2 is different.

In the present embodiment, a boundary BD between the first region RE1 and the second region RE2 overlaps both a first surface F1 and a second surface F2. Therefore, an exposed region EX includes a first exposed region EX1, and a fixed region FX includes a first fixed region FX1 and a second fixed region FX2. Here, in the present embodiment, the first region RE1 includes a filter region FR, the first exposed region EX1, and the second fixed region FX2, and the second region RE2 includes the first fixed region FX1 and an outer peripheral region PE.

The exposed region EX of the present embodiment is configured similarly to the exposed region EX of the first embodiment, except that a second exposed region EX2 is omitted. Further, the fixed region FX of the present embodiment is configured similarly to the fixed region FX of the first embodiment, except that the second fixed region FX2 is added.

The second fixed region FX2 is positioned between the first fixed region FX1 and the first exposed region EX1, and is in contact with both the first surface F1 and the second surface F2. An adhesive AD adheres to the second fixed region FX2. Here, since a plurality of first holes 610 are provided in the first region RE1 as described above, the adhesive AD adhering to the second fixed region FX2 is in contact with both the first surface F1 and the second surface F2 through each first hole 610. Thereby, the filter member 600A is bonded to each of the first surface F1 and the second surface F2 in the second fixed region FX2.

In the present embodiment, the second fixed region FX2 is provided over the entire periphery of the first region RE1 in a circumferential direction. The second fixed region FX2 may also be provided over only a part of the first region RE1 in the circumferential direction.

A width WF1 of the first fixed region FX1 may be larger than a width WF2 of the second fixed region FX2. In this case, a bonding strength of the filter member 600A with respect to the first surface F1 and the second surface F2 can be increased compared to an aspect in which the width WF1 is smaller than the width WF2.

Also according to the second embodiment described above, a bonding strength of the filter member 600A with respect to a flow path substrate 510 and a case 580 can be increased. In the present embodiment, the first region RE1 includes the second fixed region FX2 as described above. The second fixed region FX2 is positioned between the first fixed region FX1 and the first exposed region EX1, and is in contact with both the first surface F1 and the second surface F2, and the adhesive adheres to the second fixed region FX2. Therefore, a second hole 620 is prevented from being exposed to the second opening 581. As a result, in the unlikely event that a gap occurs between the first surface F1 of the flow path substrate 510 and the first exposed region EX1 due to bending of the first region RE1 of the filter member 600A toward a second flow path R2 because, for example, the first exposed region EX1 and the flow path substrate 510 are not bonded properly by the adhesive AD, a possibility that foreign matter passes through the second hole 620 is reduced. As a result, variations in filter performance of the filter member 600A can be reduced.

Further, as described above, the filter region FR has a shape extending along the Y axis, which is an example of the "first axis". In a cross section orthogonal to the Y axis, the width WF1 of the first fixed region FX1 is larger than the width WF2 of the second fixed region FX2, so that the bonding strength of the filter member 600A with respect to the first surface F1 and the second surface F2 can be increased.

C: Modified Examples

Each of the embodiments exemplified above can be modified in various ways. Specific modified aspects that can be applied to each embodiment described above are described below by way of example. The aspects arbitrarily selected from the following examples can be appropriately and compatibly combined.

C1: Modified Example 1

In each of the above embodiments, the second flow path R2 is provided upstream of the first flow path R1, but the second flow path R2 may be provided downstream of the first flow path R1.

C2: Modified Example 2

In each of the above embodiments, the serial type liquid ejecting apparatus 100 in which the transport body 41 on which the head chip 51 is mounted reciprocates is illustrated, but the present disclosure is also applicable to a line type liquid ejecting apparatus in which the plurality of nozzles N are distributed over the entire width of the recording medium M.

C3: Modified Example 3

The liquid ejecting apparatus 100 exemplified in the above embodiments may be employed in various devices such as a facsimile machine and a copying machine in addition to a device dedicated to printing, and the application of the present disclosure is not particularly limited. The use of the liquid ejecting apparatus is not limited to printing. For example, the liquid ejecting apparatus that ejects a solution of a coloring material is used as a producing apparatus that forms a color filter of a display apparatus such as a liquid crystal display panel. Further, the liquid ejecting apparatus that ejects a solution of a conductive material is used as a producing apparatus that forms a wiring or electrode of a wiring substrate. Further, the liquid ejecting apparatus that ejects a solution of organic matter related to a living body is used as, for example, a producing apparatus that produces a biochip.

What is claimed is:

1. A liquid ejecting head comprising:

a nozzle configure to eject liquid;

a first flow path member having a first surface in which a first opening of a first flow path communicating with the nozzle is formed;

a second flow path member having a second surface in which a second opening of a second flow path communicating with the nozzle and coupled to the first flow path is formed; and a filter member that is disposed between the first surface and the second surface, wherein the second opening is larger than the first opening in plan view, the filter member has a first region in which first holes are provided, and a second region which is positioned around the first region and in which second holes are provided in the plan view, the first region includes a filter region which partitions off the first opening and the second opening and through which the liquid to be supplied to the nozzle passes, the second region is in contact with both the first surface and the second surface, and includes a first fixed region to which an adhesive adheres, and an area of each of the second holes is larger than an area of each of the first holes in the plan view.

2. The liquid ejecting head according to claim 1, wherein the second holes are configured using holes whose shape is any one of a triangle, a quadrangle, and a hexagon in the plan view.

3. The liquid ejecting head according to claim 2, wherein the second holes are configured using holes whose shape is a regular hexagon in the plan view.

4. The liquid ejecting head according to claim 3, wherein $$G<H/3^{1/2},$$

H is a length of one side of each of the second holes, and G is a distance between two adjacent second holes among the second holes.

5. The liquid ejecting head according to claim 3, wherein the filter member is an electroformed component.

6. The liquid ejecting head according to claim 1, wherein the first region further includes a first exposed region positioned around the filter region, overlapping the first surface, and exposed to the second opening in the plan view.

7. The liquid ejecting head according to claim 6, wherein the first region further includes a second fixed region which is positioned between the first fixed region and the first exposed region and is in contact with both the first surface and the second surface, and to which the adhesive adheres.

8. The liquid ejecting head according to claim 7, wherein the filter region has a shape extending along a first axis, and a width of the first fixed region is larger than a width of the second fixed region in a cross section orthogonal to the first axis.

9. The liquid ejecting head according to claim 1, wherein the second region further includes a second exposed region positioned between the first fixed region and the filter region, overlapping the first surface, and exposed to the second opening in the plan view.

10. The liquid ejecting head according to claim 1, wherein an entire portion of at least one second hole provided in the first fixed region among the second holes is closed by the first surface and the second surface.

11. The liquid ejecting head according to claim 1, wherein an opening ratio of the second region is larger than an opening ratio of the first region.

12. The liquid ejecting head according to claim 11, wherein a difference between the opening ratio of the second region and the opening ratio of the first region is 5% or more.

13. The liquid ejecting head according to claim 1, wherein a diameter of an inscribed circle of each of the first holes is smaller than a diameter of an inscribed circle of the nozzles in the plan view.

14. The liquid ejecting head according to claim 13, wherein each of the first holes has a circular shape in the plan view.

15. A liquid ejecting apparatus comprising:

the liquid ejecting head according to claim 1.

* * * * *